United States Patent
Forand et al.

(10) Patent No.: US 7,590,101 B2
(45) Date of Patent: Sep. 15, 2009

(54) REMOTE OPERATIONS USING WIRELESS PERSONAL AREA NETWORK

(75) Inventors: Richard A. Forand, Portland, OR (US); Riley W. Jackson, Portland, OR (US); James P. Kardach, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 893 days.

(21) Appl. No.: 10/814,047

(22) Filed: Mar. 31, 2004

(65) Prior Publication Data

US 2005/0226178 A1  Oct. 13, 2005

(51) Int. Cl.
*H04J 3/06* (2006.01)

(52) U.S. Cl. .................. 370/350; 370/338; 370/401; 370/310

(58) Field of Classification Search .................. None
See application file for complete search history.

(56) References Cited

U.S. PATENT DOCUMENTS

| | | | |
|---|---|---|---|
| 6,829,288 B2 * | 12/2004 | Orava ........................ 375/132 |
| 2002/0129107 A1 * | 9/2002 | Loughran et al. ........... 709/206 |
| 2003/0100308 A1 * | 5/2003 | Rusch ........................ 455/445 |
| 2003/0114206 A1 * | 6/2003 | Timothy et al. ............. 455/575 |
| 2003/0158891 A1 * | 8/2003 | Lei et al. .................... 709/203 |
| 2004/0128319 A1 * | 7/2004 | Davis et al. .............. 707/104.1 |
| 2004/0184466 A1 * | 9/2004 | Chang et al. ................ 370/401 |
| 2004/0204031 A1 * | 10/2004 | Kardach et al. .......... 455/552.1 |
| 2004/0259589 A1 * | 12/2004 | Bahl et al. ............... 455/553.1 |
| 2005/0066006 A1 * | 3/2005 | Fleck et al. ................. 709/206 |

* cited by examiner

*Primary Examiner*—Duc C Ho
(74) *Attorney, Agent, or Firm*—Dana B. LeMoine; LeMoine Patent Services, PLLC

(57) ABSTRACT

A computer includes a wireless personal area network (WPAN) interface, a wireless local area network (WLAN) interface and a wireless wide area network (WWAN) interface. A device communicating with the wireless personal area network can command the computer to perform actions using the wireless local area network interface or wireless wide area network interface.

17 Claims, 5 Drawing Sheets

REMOTE OPERATIONS USING WIRELESS PERSONAL AREA NETWORK

FIELD

The present invention relates generally to computer networks, and more specifically to wireless personal area networks.

BACKGROUND

Some computers are able to enter a reduced power state. For example, notebook and laptop computers typically have a sleep mode or hibernation mode that provides reduced power consumption in return for reduced functionality.

DESCRIPTION OF EMBODIMENTS

Figure 1:
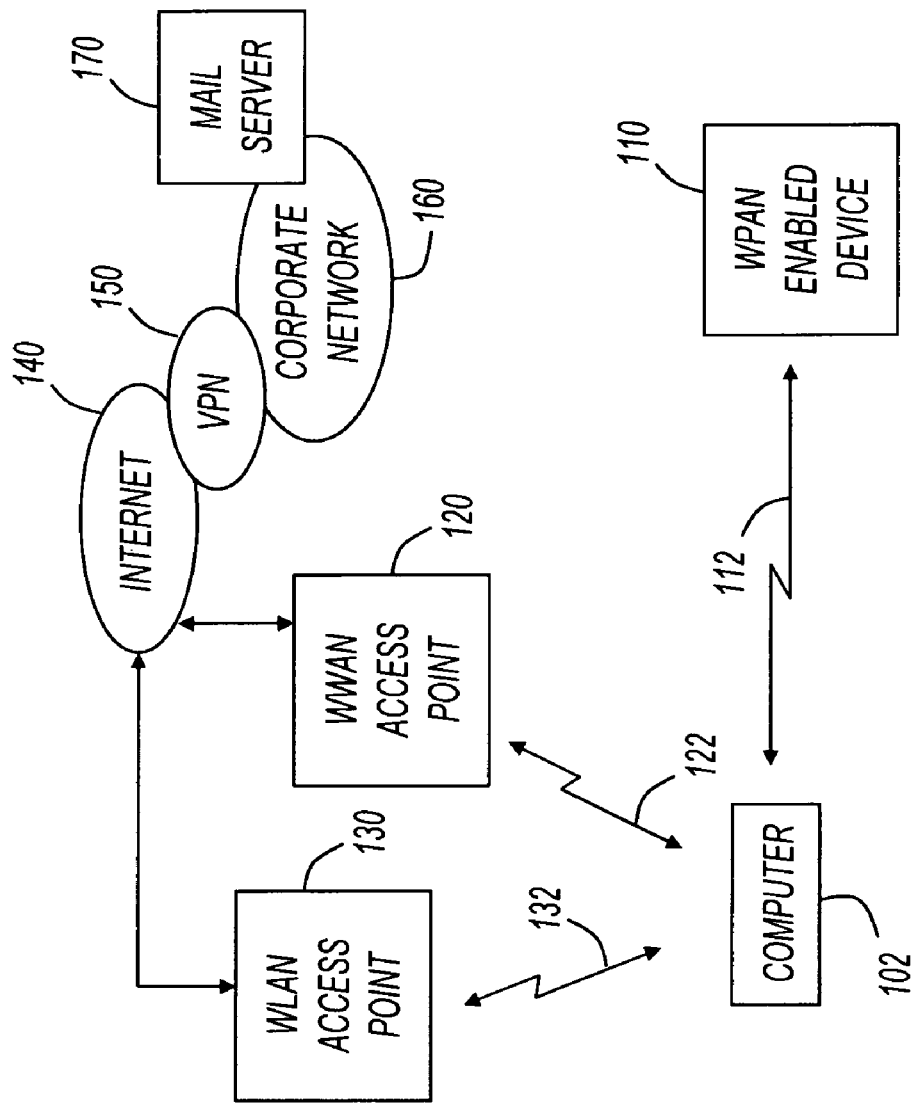
FIG. 1 shows a diagram of networked elements.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of networked elements. Computer 102 and wireless personal area network (WPAN) enabled device 110 are networked using signal 112. As used herein, "WPAN" refers to any short range networking protocol. For example, WPAN enabled device 110 may communicate with computer 102 using a Bluetooth interface. BLUETOOTH is a trademark owned by Telefonaktiebolaget L.M. Ericsson, Sweden. Although Bluetooth is described as a possible WPAN implementation useful in various embodiments of the present invention, this is not a limitation of the present invention. For example, WPAN protocols other than Bluetooth may be utilized without departing from the scope of the present invention.

In some embodiments, computer 102 is a laptop computer or notebook computer that may be put into a reduced power state and carried about. For example, computer 102 may be a notebook computer that will hibernate when closed. Also for example, computer 102 may be a computer that is designed to be carried about in a briefcase or special computer case.

In some embodiments, WPAN enabled device 110 may be a handheld device or other portable device. For example, WPAN enabled device 110 may be a cellular phone or personal digital assistant (PDA) with a Bluetooth interface. In some embodiments, WPAN enabled device 110 may communicate with computer 102 when all or a portion of computer 102 is in a reduced power state. In some of these embodiments, some computer functionality may be available to a user that operates WPAN enabled device 110. These embodiments and others are described more fully below.

Computer 102 and wireless local area network (WLAN) access point 130 are shown networked using signal 132. As used herein, "WLAN" refers to any wireless local area networking protocol. For example, WLAN access point 130 may communicate with computer 102 in compliance with a wireless network standard such as ANSI/IEEE Std. 802.11, 1999 Edition, although this is not a limitation of the present invention. As used herein, the term "802.11" refers to any past, present, or future IEEE 802.11 standard, or extension thereto, including, but not limited to, the 1999 edition.

WLAN access point 130 may be in any location. For example, WLAN access point 130 may be located in a corporate setting, an airport, a coffee shop, a municipality, or any other location. In some embodiments, many WLAN access points exist, and one WLAN access point is chosen by computer 102 for networking. In other embodiments, when computer 102 searches for an available WLAN access point, none are available, and WLAN access point 130 is not used as shown in FIG. 1.

Computer 102 and wireless wide area network (WWAN) access point 120 are shown networked using signal 122. As used herein, "WWAN" refers to any wireless wide area networking protocol. For example, WWAN access point 120 may communicate with computer 102 using a packet-based protocol such as General Packet Radio Service (GPRS), enhanced GPRS (EGPRS) or the like.

In some embodiments, WWAN access point 120 may be co-located with a cellular base station. For example, WWAN access point 120 may be co-located with cellular base stations in a global system for mobile communications (GSM) network. Also for example, WWAN access point 120 may be co-located with cellular base stations other than GSM stations. In some embodiments, many WWAN access points exist, and one WWAN access point is chosen by computer 102 for networking. In other embodiments, when computer 102 searches for an available WWAN access point, none are available, and WWAN access point 120 is not used as shown in FIG. 1.

As shown in FIG. 1, WLAN access point 130 and WWAN access point 120 may be utilized to access the Internet shown as 140. Also shown in FIG. 1 are mail server 170 and corporate network 160 coupled to the Internet by virtual private network (VPN) 150. In some embodiments, computer 102 may access email or other data on mail server 170 using either WLAN access point 130 or WWAN access point 120. For example, a personal information manager (PIM) on computer 102 may synchronize its enterprise database with a similar database on mail server 170 while computer 102 is in a "closed lid" configuration (e.g., a notebook computer that is closed and perhaps in the user's briefcase). Information that may be synchronized includes email, contacts, calendar information, and the like, although the type of information shared between computer 102 and mail server 170 is not a limitation of the present invention.

In some embodiments, computer 102 may communicate with devices other than mail server 170 or corporate network 160. For example, computer 102 may synchronize data with websites or other databases. Any useful information may be transferred between computer 102 and other devices connected to either WLAN access point 130 or WLAN access point 120.

Computer 102 may perform these operations in response to a request received from WPAN enabled device 110. For example, a user may perform work such as creating email or appointments when not in range of an access point, and then at a later time may use WPAN enabled device 110 to command computer 102 to synchronize the email or appointments. One example usage pattern is described in the following paragraphs.

A business traveler (user) may be using a notebook computer on an airplane, and during the flight may create several important emails which are resident on the computer, and are not sent because of lack of network availability. Just prior to the airplane landing, the user may close the notebook computer and place it in a briefcase. Once walking off the plane, the user may take out a WPAN enabled cellular phone and indicate to the notebook (through a menu which appears on the cellular phone) to start looking for network access, and then put the cellular phone away. A bit later the user's cellular phone rings and the user is made aware (through the cellular phone's display) that there are one or more 802.11 WLAN access points (hotspots) within the area, and the cellular phone prompts the user if they wish to synchronize their email over one of the available hotspots. The user (who decides that it would be nice to synchronize his mail) starts the process of synchronization by scrolling down to the appropriate response and executing the command. The user may then put the cellular phone away.

In the background, the notebook computer then connects to the hotspot over its integrated WLAN interface (while still in the briefcase), connects to the mail server via a networked VPN connection, using cached credentials to authorize the connection (or by prompting the user for proper authorization via the user's cell-phone) and initiates the synchronization process. The notebook can notify the user if they start walking out of the WLAN coverage area in order to allow the synchronization to complete. When the notebook has completed the synchronization it would breakdown the VPN connection and then may notify the user of its completion by once again ringing their cellular phone. Newly received emails may be added to the on-screen view on the cellular phone as well.

If the computer is unable to locate a hotspot and the user still would like to send or receive mail, the user may choose to synchronize their inbox using the WWAN network connection. Once again, synchronization results may appear on the cellular phone's menu system for quick traversal.

Figure 2:
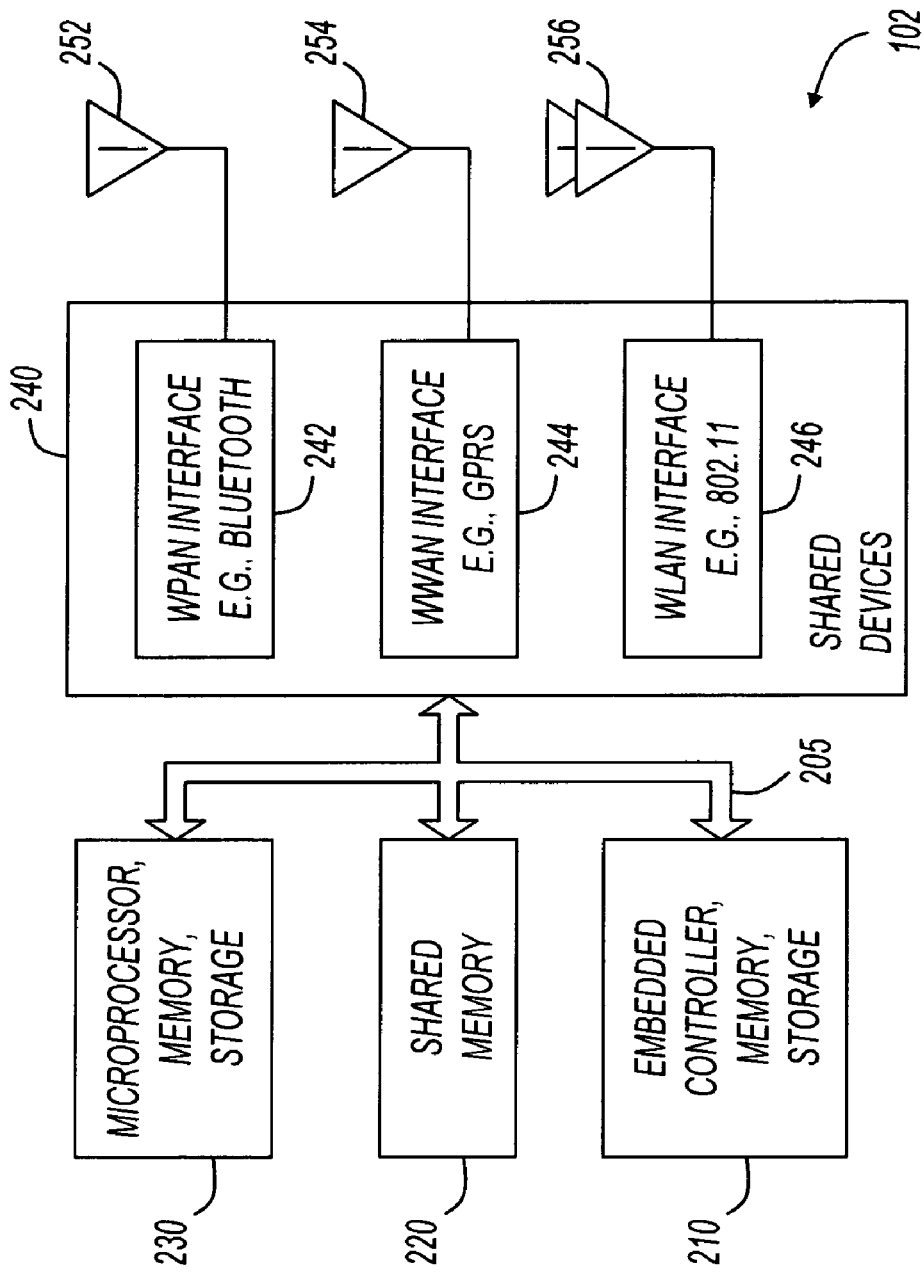
FIG. 2 shows a diagram of a computer.

FIG. 2 shows a diagram of a computer. Computer 102 may be a laptop computer, notebook computer, handheld computer, or any other type of computer useful for performing as described herein. As shown in FIG. 2, computer 102 includes microprocessor, memory, and storage 230, shared memory 220, embedded controller, memory, and storage 210, and shared devices 240. In some embodiments, microprocessor, memory, and storage 230 are elements of computer 102 that are powered down or otherwise non-operational when computer 102 is asleep or hibernating. For example, computer 102 may be a notebook computer capable of a lowered power state when in a "closed lid" configuration, and microprocessor, memory, and storage 230 may be elements that are powered down to save power. In some embodiments, microprocessor of 230 may be the main central processing unit (CPU) of the computer, and the memory and storage of 230 may correspond to the main memory systems and hard disks.

Embedded controller, memory, and storage 210 are elements that are able to continue operating when computer 102 is in a low power state. For example, if computer 102 is hibernating and the microprocessor is non-operational, embedded controller may still be operational, and may be able to communicate using shared devices 240.

The memory and storage of 210 represent articles that include one or more machine readable media. For example, they may represent any one or more of the following: a hard disk, a floppy disk, random access memory (RAM), read only memory (ROM), flash memory, or any other type of article that includes a medium readable by the embedded controller. The memory and storage of 210 can store instructions for performing the execution of the various method embodiments of the present invention.

In operation, the embedded controller may read instructions and data from the memory and storage of 210 and perform actions in response thereto. For example, the embedded controller may access instructions from the memory and communicate with shared devices 240 using bus 205. The embedded controller may perform various method embodiments of the present invention. For example, the embedded controller may receive requests from a WPAN enabled device such as WPAN enabled device 110 (FIG. 1), and initiate communications to either a WLAN access point such as WLAN access point 130 (FIG. 1) or a WWAN access point such as WWAN access point 120 (FIG. 1).

Shared memory 220 is shown shared with the various other devices using bus 205. In some embodiments, shared memory is functional when microprocessor, memory, and storage 230 are in a reduced power state. For example, when computer 102 is in asleep, the embedded controller of 210 may be able to access shared memory 220. The embedded controller may store information in, or retrieve information from, shared memory 220. For example, embedded controller may access an enterprise database to synchronize it with data on another computer when computer 102 is asleep. Shared memory 220 represents an article that includes a machine readable medium. Various method embodiments of the present invention may be performed by a microprocessor or embedded controller by accessing instructions from shared memory 220.

Shared devices 240 includes WPAN interface 242, WWAN interface 244, and WLAN interface 246. Each of the shared devices may be operated by either the microprocessor of 230 or the embedded controller of 210. In some embodiments, the shared devices are controlled by the embedded controller, and the microprocessor accesses the shared devices by requesting access through the embedded controller.

In some embodiments, the shared devices are functional when computer 102 is asleep. For example, when the microprocessor is in a reduced power state, the embedded controller may be able to communicate with a WPAN enabled device using WPAN interface 242, with a WWAN access point using WWAN interface 244, and with a WLAN access point using WLAN interface 246. In these embodiments, the embedded controller may receive requests through WPAN interface 242, and connect to one or more networks using an interface other than the WPAN interface in response to the request.

Each of the interfaces in shared devices 102 may be adapted to transmit and receive signals of various formats and at various frequencies. For example, WWAN interface 244 may be adapted to receive time domain multiple access (TDMA) signals, code domain multiple access (CDMA) signals, global system for mobile communications (GSM) signals, or the like. Likewise, WLAN interface 246 may be adapted to receive orthogonal frequency division multiplexing (OFDM) signals, multiple-input-multiple-output (MIMO) signals, spatial-division multiple access (SDMA) signals, or any other type of communications signals. The present invention is not limited in this regard.

Antenna 252 is coupled to WPAN interface 242; antenna 254 is coupled to WWAN interface 244; and antennas 256 are coupled to WLAN interface 246. Antennas 256 may include one or more antennas. For example, antennas 256 may include a single directional antenna or an omni-directional antenna. As used herein, the term omni-directional antenna refers to any antenna having a substantially uniform pattern in at least one plane. For example, in some embodiments, antennas 256 may include a single omni-directional antenna such as a dipole antenna, or a quarter wave antenna. Also for example, in some embodiments, antennas 256 may include a single directional antenna such as a parabolic dish antenna or a Yagi antenna. In still further embodiments, antennas 256 include multiple physical antennas. For example, in some embodiments, multiple antennas are utilized to perform multiple-input-multiple-output (MIMO) processing or spatial-division multiple access (SDMA) processing.

The embedded controller and one or more of the shared devices interfaces may be packaged together as a single apparatus. For example, a computer may be available without the apparatus, or the computer may be available with the apparatus. In some embodiments, the apparatus is modular such that it may added to a computer.

Computer 102 may include many components in addition to those shown in FIG. 2. For example, computer 102 may include memory management units, graphics processing hardware, or the like. In general, computer 102 may include any hardware or software that may be useful for a computer. For simplicity and clarity, computer 102 is shown in FIG. 2 with less than all possible components. The various embodiments of the present invention are not meant to be limited in this respect.

Figure 3:
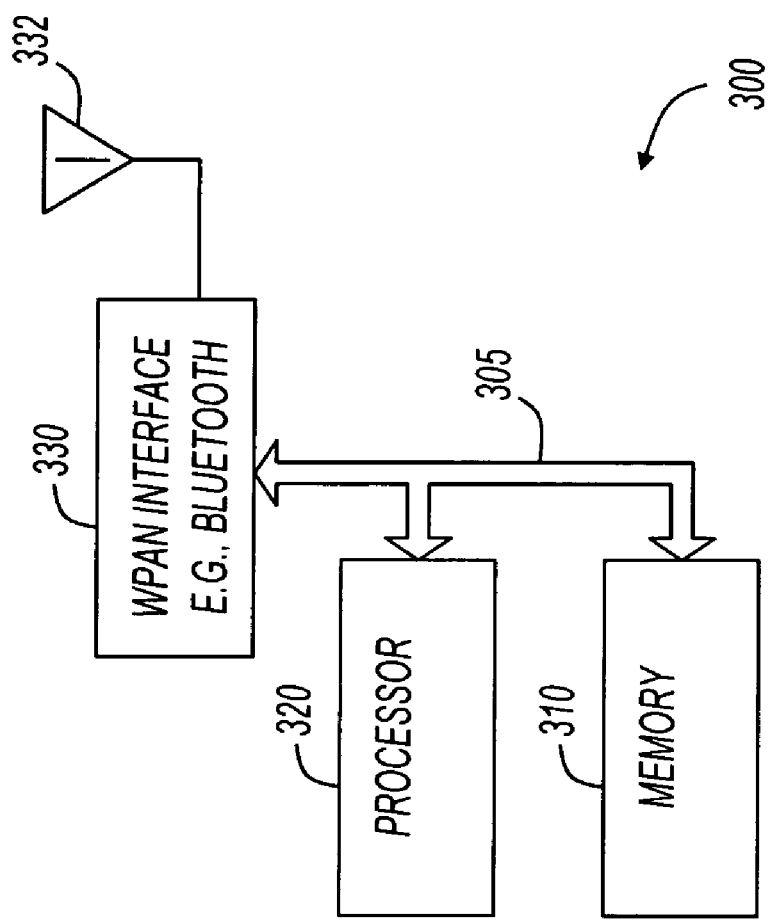
FIG. 3 shows a diagram of a wireless personal area network (WPAN) enabled device.

FIG. 3 shows a diagram of a wireless personal area network (WPAN) enabled device. WPAN enabled device 300 includes processor 320, memory 310, WPAN interface 330, and antenna 332. WPAN enabled device 300 may be a device capable of communicating with a computer. For example, WPAN enabled device 300 may be used as WPAN enabled device 110 (FIG. 1), and may be a cellular phone, a personal digital assistant, or the like.

Memory 310 represents an article that includes a machine readable medium. For example, memory 310 represents any one or more of the following: a hard disk, a floppy disk, random access memory (RAM), read only memory (ROM), flash memory, or any other type of article that includes a medium readable by processor 320. Memory 310 can store instructions for performing the execution of the various method embodiments of the present invention.

In operation, processor 320 reads instructions and data from memory 310 and performs actions in response thereto. For example, processor 320 may access instructions from memory 310 and communicate with WPAN interface 330 using bus 305. WPAN interface 330 may receive data from processor 320 and transmit it to other devices such as computer 102 (FIGS. 1, 2). WPAN interface 330 may also receive data from various other devices and provide it to processor 320. For example, WPAN interface 330 may receive information from a computer such as computer 102 (FIGS. 1, 2), and provide that data to processor 320.

Antenna 332 may include one or more antennas. For example, antenna 332 may include a single directional antenna or an omni-directional antenna. For example, in some embodiments, antenna 332 may include a single omni-directional antenna such as a dipole antenna, or a quarter wave antenna. Also for example, in some embodiments, antenna 332 may include a single directional antenna such as a parabolic dish antenna or a Yagi antenna. In still further embodiments, antenna 332 may include multiple physical antennas.

WPAN enabled device 300 may include many components in addition to those shown in FIG. 3. For example, device 300 may include transmit and receive circuitry to support operation as a cellular phone. Also for example, device 300 may include a keyboard and display. In general, WPAN enabled device 300 may include any hardware or software that may be useful. For simplicity and clarity, WPAN enabled device 300 is shown in FIG. 3 with less than all possible components. The various embodiments of the present invention are not meant to be limited in this respect.

Figure 4:
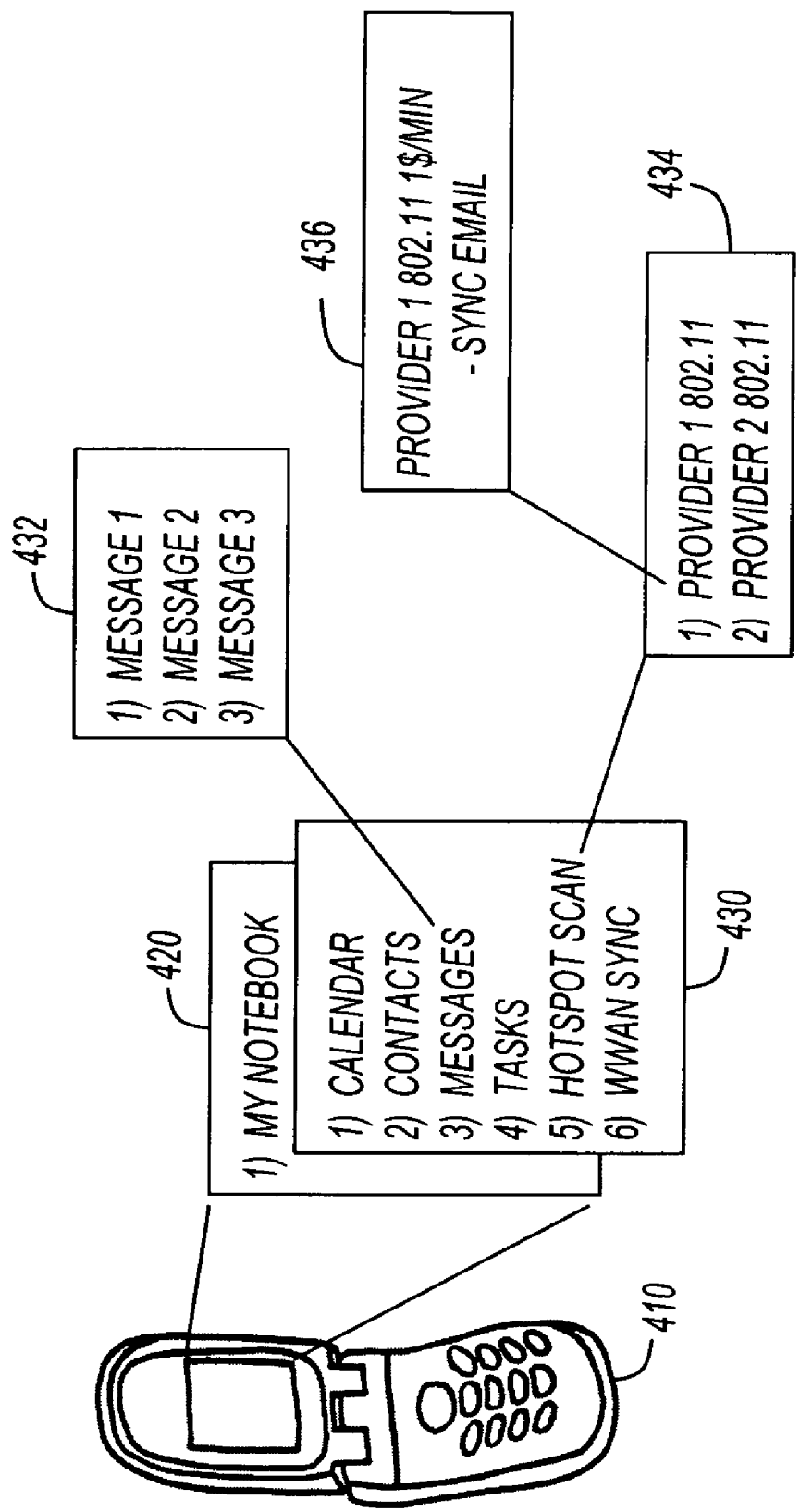
FIG. 4 shows a diagram of a cellular phone and menu structures in accordance with various embodiments of the present invention.

FIG. 4 shows a diagram of a cellular phone and menu structures in accordance with various embodiments of the present invention. Cellular phone 410 is an example of a WPAN enabled device such as WPAN enabled device 110 (FIG. 1) or WPAN enabled device 300 (FIG. 3). In some embodiments, cellular phone 410 may operate in accordance with the various embodiments previously described. For example, cellular phone 410 may be used to send a request to a computer for the computer to access a network. The request may be sent from cellular phone 410 using a WPAN protocol such as Bluetooth, and the computer may access a network using a network interface other than a WPAN interface. For example, the computer may access a network using a WLAN interface or a WWAN interface.

In response to the request, the computer may communicate across a network, and may also provide cellular phone 410 with information in response. For example, if cellular phone 410 requests the computer to synchronize an enterprise database while the computer is asleep, the computer may respond by sending email "inbox" information back to cellular phone 410.

Cellular phone 410 may include a display, and during operation, the display may provide a menu structure for a user to make choices relating to the operation of the phone. The menu structure shown in FIG. 4 is an example menu structure. Other menu structures, including menu structures to support different functionality may be provided without departing from the scope of the present invention.

Menu 420 represents a top-level menu. It shows a single item ("my notebook") that allows access to a computer that is connected to the phone using a WPAN. Submenu 430 corresponds to a menu that may be displayed when the "my notebook" entry of menu 420 is selected. Submenu 430 shows options relating to data that may be synchronized for a personal information manager or enterprise database. Submenus 430, 434, and 436 also show connectivity options relating to network interfaces on the connected computer.

In some embodiments, cellular phone 420 may retrieve information from a computer even when the computer is asleep. For example, email messages that have been synchronized on the computer may be retrieved by cellular phone 410 and displayed as shown in submenu 432. Also for example, contact information, calendar information, tasks, or any other information may also be retrieved and displayed by cellular phone 410.

Figure 5:
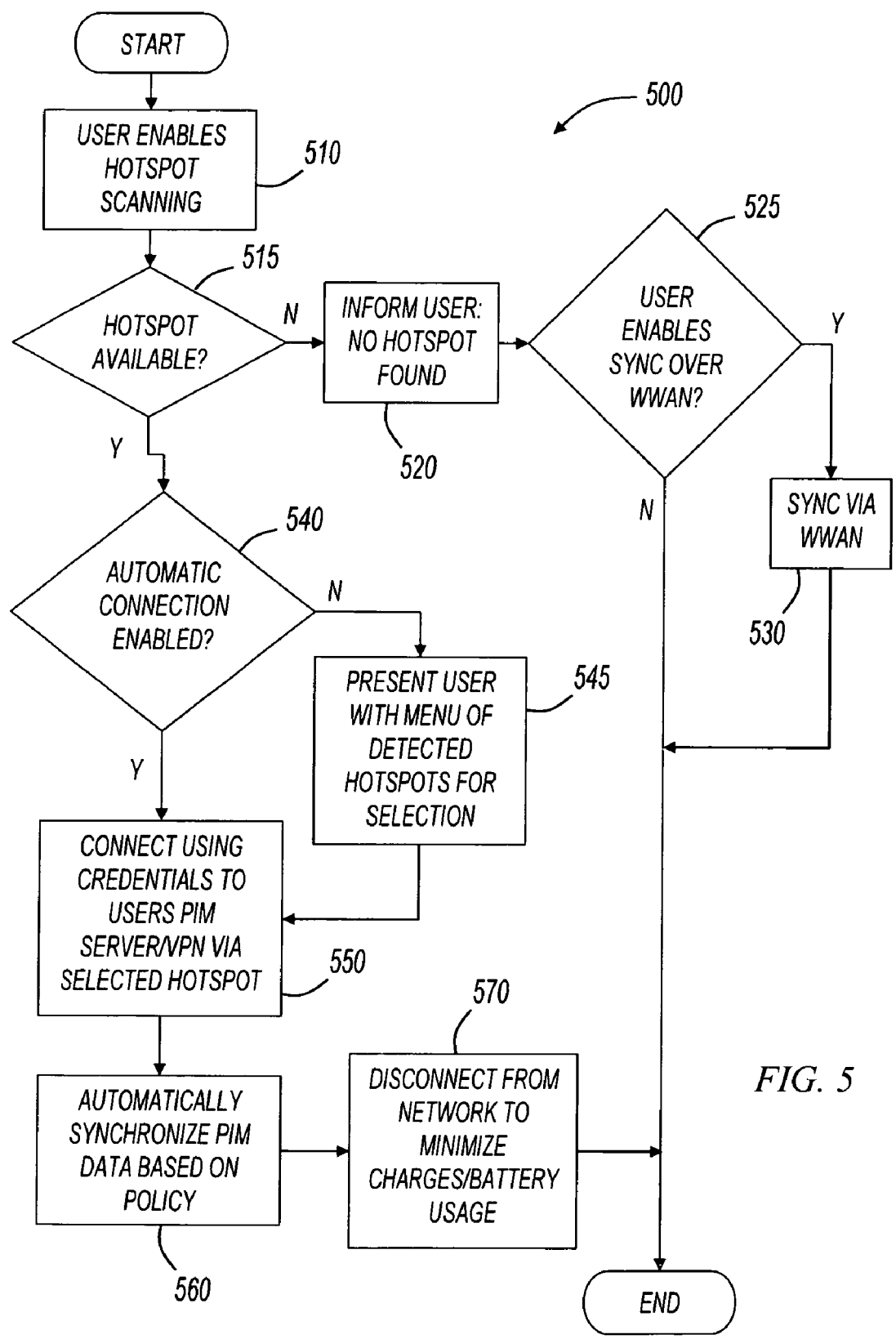
FIG. 5 shows a flowchart in accordance with various embodiments of the present invention.

FIG. 5 shows a flowchart in accordance with various embodiments of the present invention. In some embodiments, method 500 may be used to access a WLAN or WWAN in response to a request from a WPAN enabled device. In some embodiments, method 500, or portions thereof, is performed by a computer, a processor, or an embedded controller, embodiments of which are shown in the various figures. Method 500 is not limited by the particular type of apparatus, software element, or system performing the method. The various actions in method 500 may be performed in the order presented, or may be performed in a different order. Further, in some embodiments, some actions listed in FIG. 5 are omitted from method 500.

Method 500 is shown beginning at block 510 in which the user enables hotspot scanning. This may be performed by the user when operating the computer directly, or may be performed using a menu on a WPAN enabled device. As used herein the term "hotspot" refers to available WLAN connectivity, such as an accessible 802.11 access point. If a hotspot is available, then the computer may be able to connect to a network via a WLAN.

In some embodiments, a user may enable automatic connection so that the computer may connect to a WLAN automatically, or a user may disable automatic connection. Automatic connection enabling may be performed by the user when operating the computer directly, or may be performed using a menu on a WPAN enabled device. At 540, if automatic connection is not enabled, then the computer may present the user with a menu of detected hotspots for selection. In some embodiments, the menu may appear similar to submenus 434 and 436 (FIG. 4).

If automatic connection is enabled, or if the user selects a hotspot from a menu, the computer may connect to a personal information manager server at 550. In some embodiments, the connection may be made via a virtual private network (VPN), and the computer may prompt the user for credentials via the WPAN enabled device. In other embodiments, VPN credentials may be cached in the computer so that the computer may be able to make the connection without prompting the user.

At 560, the computer utilizes the connection to automatically synchronize the personal information manager data or enterprise database based on a policy. The policy may be any policy set by the user using the computer or WPAN enable device. For example, the policy may only allow the sending of email, the receipt of email, or synchronizing of appointments in a calendar. The type of amount of synchronization set by the policy is not a limitation of the present invention.

A computer or embedded controller performing method 500 may contact a WPAN enabled device to indicate that the operation is complete. For example, in some embodiments, an embedded controller within a computer that is otherwise asleep may send email inbox information to a WPAN enabled device such as a cellular phone, and cause the cellular phone to ring to alert the user that the operation is complete.

Referring now back to 515, if a hotspot is not available, the computer may inform the user that no hotspots are found at 520. In some embodiments, this may be accomplished by sending data back to the WPAN enabled device for display. If the user has enabled WWAN synchronization, the computer may attempt to synchronize the personal information manager data or enterprise data over a WWAN. For example, a computer may use a GPRS modem to attempt to connect to a network. If a WWAN access point is available, the computer may connect over a VPN using cached credentials or prompt the user for credentials.

In some embodiments, the WWAN synchronization operation may use the same policy that is set up for the WLAN synchronization discussed above. In other embodiments, the WWAN synchronization may be performed using a different policy.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method of synchronizing information in a portable computer with information in a corporate network server comprising:

receiving at the portable computer a request over a wireless personal area network (WPAN) to search for networks other than the WPAN, the request originating from a handheld WPAN enabled device;

notifying the handheld device of the existence of a network other than the WPAN;

receiving at the portable computer a command to connect to the corporate network server using the network other than the WPAN, the command originating from the handheld WPAN enabled device;

connecting to the corporate network server using the network other than the WPAN in response to the command; and synchronizing the information in the portable computer with the information in the corporate network server.

2. The method of claim 1 further comprising notifying the handheld device of the synchronizing.

3. The method of claim 1 wherein the command to connect to a corporate network server comprises connecting using cached credentials.

4. The method of claim 1 wherein the command includes a command to connect to an access point in a wireless local area network.

5. The method of claim 4 wherein the command to connect to an access point comprises connecting to an 802.11 compliant access point.

6. The method of claim 1 wherein the command includes a command to connect to a wireless wide area network.

7. The method of claim 6 wherein the command to connect to a wireless wide area network comprises connecting to a General Packet Radio Service (GPRS) network.

8. A method comprising:

searching for a network connection other than a wireless personal area network (WPAN) from a portable computer;

notifying a handheld device over the WPAN when a network other than the WPAN is found;

receiving from the handheld device over the WPAN a request to connect to the network other than the WPAN;

connecting to the network other than the WPAN in response to the request;

responding to the request over the WPAN; and synchronizing an email from the portable computer with email in a corporate network server connecting to the network.

9. The method of claim 8 wherein the request includes a request to connect to a corporate network.

10. The method of claim 9 wherein the request to connect to a corporate network comprises connecting using cached credentials.

11. A computer readable medium encoded with computer executable instructions for synchronizing information in a portable computer with information in a corporate network server that when executed by a portable computer result in the portable computer performing:

receiving at the portable computer a request over a wireless personal area network (WPAN) to search for networks other than the WPAN, the request originating from a handheld WPAN enabled device;

notifying the handheld device of the existence of a network other than the WPAN;

receiving at the portable computer a command to connect to the corporate network server using the network other than the WPAN, the command originating from the handheld WPAN enabled device;

connecting to the corporate network server using the network other than the WPAN in response to the command; and synchronizing the information in the portable computer with the information in the corporate network server.

12. The computer readable medium of claim 11 wherein the instructions when executed further result in the portable computer performing notifying the handheld device of the synchronizing.

13. The computer readable medium of claim 11 wherein the command to connect to a corporate network server comprises connecting using cached credentials.

14. The computer readable medium of claim 11 wherein the command includes a command to connect to an access point in a wireless local area network.

15. The computer readable medium of claim 14 wherein the command to connect to an access point comprises connecting to an 802.11 compliant access point.

16. The computer readable medium of claim 11 wherein the command includes a command to connect to a wireless wide area network.

17. The computer readable medium of claim 16 wherein the command to connect to a wireless wide area network comprises connecting to a General Packet Radio Service (GPRS) network.

* * * * *

UNITED STATES PATENT AND TRADEMARK OFFICE
CERTIFICATE OF CORRECTION

PATENT NO.      : 7,590,101 B2                                    Page 1 of 1
APPLICATION NO. : 10/814047
DATED           : September 15, 2009
INVENTOR(S)     : Forand et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1562 days.

Signed and Sealed this

Twenty-first Day of September, 2010

David J. Kappos
*Director of the United States Patent and Trademark Office*